United States Patent
Huynh

(10) Patent No.: US 10,343,120 B2
(45) Date of Patent: Jul. 9, 2019

(54) DYNAMIC FILTRATION TECHNOLOGY

(71) Applicant: Huy V. Huynh, Johns Creek, GA (US)

(72) Inventor: Huy V. Huynh, Johns Creek, GA (US)

(73) Assignee: DYNAMIC SEPARATION TECHNOLOGY, LLC, Alpharetta, GA (US)

( * ) Notice: Subject to any disclaimer, the term of this patent is extended or adjusted under 35 U.S.C. 154(b) by 42 days.

(21) Appl. No.: 15/433,624

(22) Filed: Feb. 15, 2017

(65) Prior Publication Data

US 2017/0341030 A1 Nov. 30, 2017

Related U.S. Application Data

(60) Provisional application No. 62/342,943, filed on May 28, 2016.

(51) Int. Cl.
| | |
|---|---|
| *B01D 53/22* | (2006.01) |
| *B01D 63/16* | (2006.01) |
| *B01D 65/08* | (2006.01) |
| *B01D 46/54* | (2006.01) |
| *B01D 46/00* | (2006.01) |
| *B01D 61/20* | (2006.01) |
| *B01D 63/06* | (2006.01) |

(52) U.S. Cl.
CPC ......... *B01D 63/16* (2013.01); *B01D 46/0056* (2013.01); *B01D 46/543* (2013.01); *B01D 61/20* (2013.01); *B01D 63/06* (2013.01); *B01D 65/08* (2013.01); *B01D 2315/02* (2013.01); *B01D 2321/2041* (2013.01)

(58) Field of Classification Search
CPC ........ B01D 2321/30; B01D 2321/2091; B01D 2315/02; B01D 65/08; B01D 63/16; B01D 46/543; B01D 46/54; B01D 2321/20
See application file for complete search history.

(56) References Cited

U.S. PATENT DOCUMENTS

| | | | | |
|---|---|---|---|---|
| 3,425,562 A | * | 2/1969 | Hamer | B01D 63/063 210/321.7 |
| 3,552,574 A | * | 1/1971 | Lowe | A23C 9/1427 210/353 |
| 3,819,513 A | * | 6/1974 | Ishii | B01D 63/06 210/321.7 |

(Continued)

*Primary Examiner* — Anthony R Shumate
(74) *Attorney, Agent, or Firm* — Bradley D. Crose; Crose Law LLC

(57) ABSTRACT

A dynamic filtration system and method for solid-fluid separation to eliminate or substantially reduce media blinding includes: a fluid inlet through which to receive an inlet flow of fluid to be filtered; a filter membrane; a rotatable mechanical barrier, disposed within an outer shell, to contain the filter membrane and through which to receive and filter the inlet flow of the fluid, the rotatable mechanical barrier configured to rotate dynamically along an axis, to create a high shear flow, thereby to prevent an accumulation of solids on the filter membrane, and whereby a resultant centrifugal force propels any solids and slurry onto the outer shell to be continuously removed from the dynamic filter system; a fluid outlet through which to disperse a filtered fluid; and a solids and slurry outlet through which to disperse solids and slurry collected in filtration when propelled to the outer shell of the mechanical barrier.

20 Claims, 2 Drawing Sheets

(56) References Cited

U.S. PATENT DOCUMENTS

| | | | | |
|---|---|---|---|---|
| 4,200,531 | A * | 4/1980 | Yanagi | B01D 63/06 |
| | | | | 210/137 |
| 4,303,192 | A * | 12/1981 | Katsume | B04B 1/20 |
| | | | | 494/10 |
| 5,466,384 | A * | 11/1995 | Prevost | B01D 17/0217 |
| | | | | 210/787 |
| 5,628,909 | A * | 5/1997 | Bellhouse | B01D 65/08 |
| | | | | 210/321.78 |
| 5,772,879 | A * | 6/1998 | Jaikaran | B01D 46/10 |
| | | | | 210/107 |
| 6,538,858 | B1 * | 3/2003 | Hasegawa | B82Y 10/00 |
| | | | | 360/324.12 |
| 9,895,635 | B2 * | 2/2018 | Levitt | B01D 29/6476 |
| 2016/0144098 | A1 * | 5/2016 | Radwanski | A61M 1/3692 |
| | | | | 210/651 |
| 2017/0107132 | A1 * | 4/2017 | Kuo | C02F 9/00 |

* cited by examiner

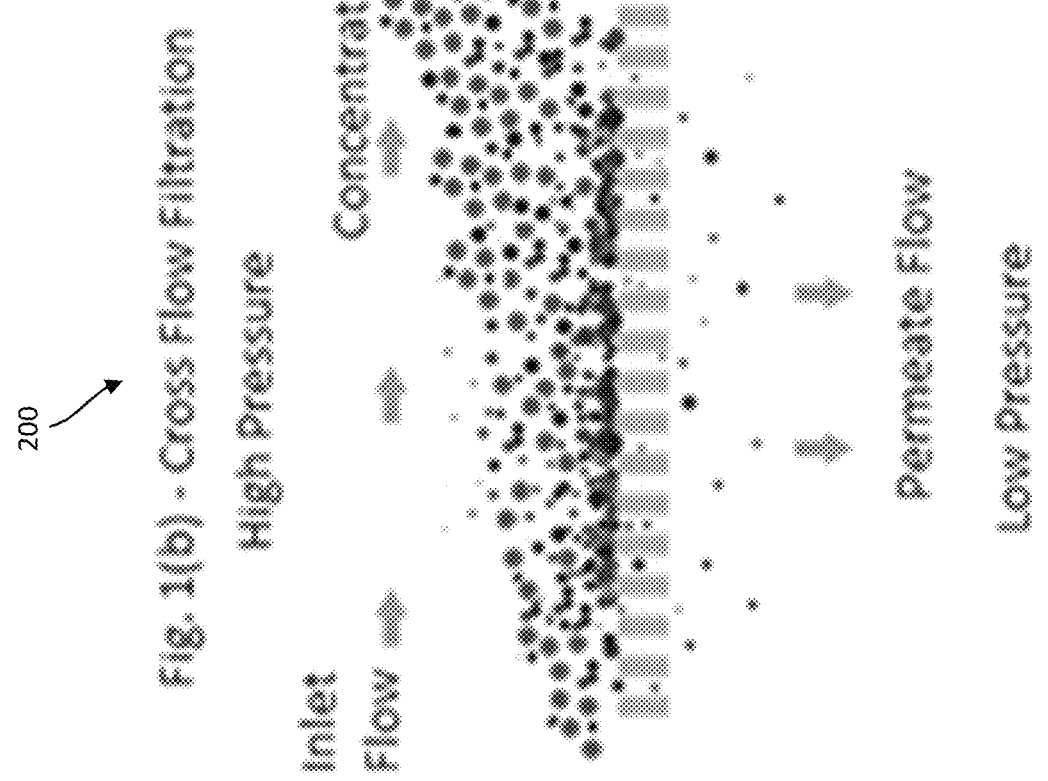
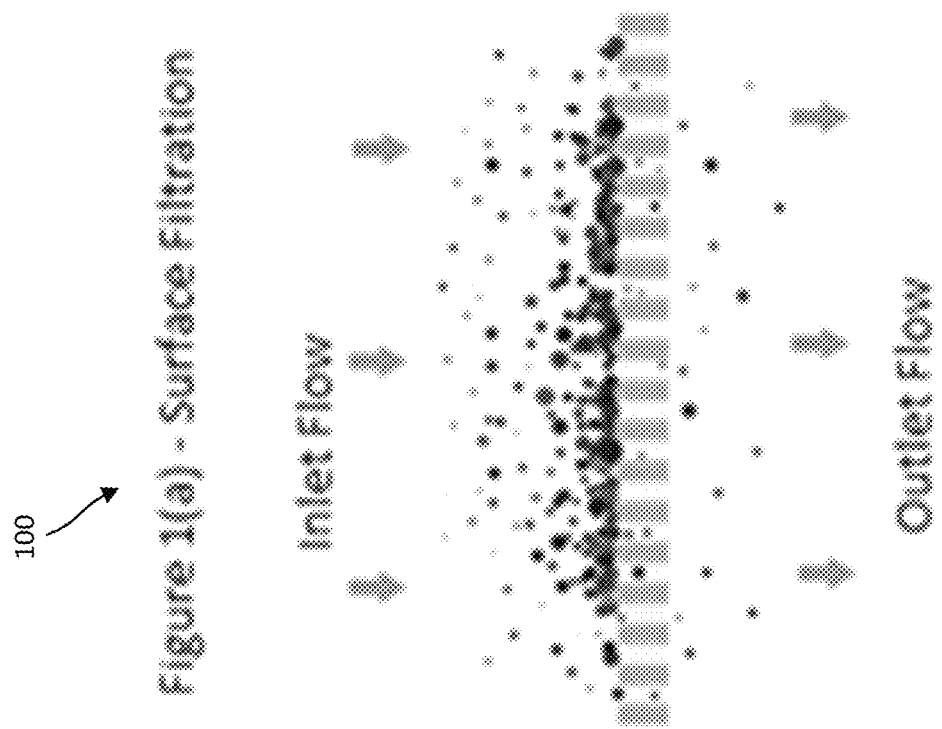
FIG. 1B
FIG. 1A

DYNAMIC FILTRATION TECHNOLOGY

CROSS-REFERENCE TO RELATED APPLICATION(S)

The present non-provisional patent application claims the benefit of priority of U.S. Provisional Patent Application No. 62/342,943 which is entitled "DYNAMIC FILTRATION TECHNOLOGY", which was filed on May 28, 2016, and which is incorporated in full by reference herein.

FIELD OF THE INVENTION

The technology described herein relates generally to methods, systems, and devices for water filtration, including mechanical barriers, solid-liquid and solid-gas separation technologies, pollution control, water sustainability, and the use of with which to support population growth and industrial development. More specifically, this technology relates to methods, systems, and devices for a novel dynamic filtration technology for solid-fluid (solid-liquid or solid-gas) separation that can eliminate, or at a minimum, reduces media blinding. Furthermore, this technology relates to methods, systems, and devices for an improved mechanical barrier that is designed to rotate along its axis, preventing solids from blinding the surface of the mechanical barrier due to the high shear force, and with the resulting centrifugal force, propels the solids onto the outer shell where it can be continuously removed from the system.

BACKGROUND OF THE INVENTION

Filtration is effectively a mechanical barrier that retains the solids while allowing the fluid (liquid or gas) to pass through. The application of solid-liquid and solid-gas separation technologies is ubiquitous in consumer products, as well as the agricultural, commercial, industrial, military and residential markets. Finally, an efficient solid-liquid separation technology is critical to pollution control, and to make water a sustainable resource to support population growth and promote industrial development.

A wide range of filter designs have been invented over the centuries for the separation of solids from a fluid (liquid or gas). The solids could be valuable products to be recovered or impurities to be removed from the fluid. There are all types of filter design available on the market, from a simple sieve design using a woven fiber cloth to advanced nano materials such as graphene; and from a simple disposable mechanical barrier and filter housing, to a complex system consisting of sensors, valves and logic controller for performance monitoring, and when required, initiate a series of back flushes and/or chemical clean-in-place processes.

All solid-fluid separation filters are based on three principal design parameters: 1) types of mechanical barrier, 2) motive force and 3) filtration surface area. The effectiveness and therefore the type of filter design required is a function of the solid-fluid separation efficiency and productivity.

An example of a high productivity and low efficiency is the common house air filter. An air filter, using a low density woven fiber membrane may be inefficient at capturing all the particulate matters, but it is productive at filtering gross particles from a very large volume of air, as depicted for example in FIG. 1(a)—Surface Filtration, 100.

An example of a high efficiency and low productivity filtration technology is reverse osmosis (RO). A RO system is designed to remove most all the dissolved solids from the fluid stream using a membrane with very small pores, making it very efficient.

To minimize solids building up in the membrane surface, a cross flow design is employed, as depicted for example FIG. 1(b)—Cross Flow Filtration, 200; however, the membrane's productivity is low hence a very large amount of surface area must be provided, and a significant percentage of the fluid is rejected (20-40%) to minimize blinding.

To improve the air filter efficiency, a more tightly bound, pleaded membrane is employed, commonly referred to as an HEPA filter. In both cases, the accumulation of solids increases the differential pressure overtime across the mechanical barrier—membrane for RO and woven fiber for an air filter. Since the cost of the membrane is expensive, a chemical clean-in-place process is employed to periodically clean the fouled membrane. The cost of a woven fiber air filter is relatively low, hence it is more practical and cost effective to replace and dispose of the used filter.

The common problem with all filtration devices on the market today is the accumulation of solids as the fluid flows tangentially across a static mechanical barrier, trapping the solids on the surface and subsequently must be cleaned or the filter media replaced. The accumulating solids on the filter media increases the pressure gradient across the mechanical barrier regardless of the types of mechanical barrier and motive force used in a filtration system.

The filter life can be extended by: increasing the surface area available for a static type screen filter (pleated cartridge and/or multiple cartridges for a solid-liquid system, or pleated HEPA filter and/or multiple chambers for a solid-gas system); mechanical compression of the solids on the filter housing and then dislodging the cake for a solid-liquid system (Fundabac®) or back pressure pulsing of the baghouse filter to dislodge the solids for a solid-gas system; physical removal of the accumulating solid cake on the filter media using a blade; back washing the media or multi-media filter; rejecting the concentrated filtration stream (reverse osmosis filter); or minimizing the accumulation of solids by imposing an high fluid velocity across filter media (cross-flow filter). The filter design available on the market today are based on a combination of these variations to remove the solids.

BRIEF SUMMARY OF THE INVENTION

The Dynamic Filtration Technology (DFT) invention is a new and novel filtration process for solid-fluid (solid-liquid or solid-gas) separation that can eliminate, or at a minimum, reduces media blinding. This is achieved by allowing the mechanical barrier itself to rotate along its axis, preventing solids from blinding the surface of the mechanical barrier due to the high shear force, and with the resulting centrifugal force, propels the solids onto the outer shell where it can be continuously removed from the system, FIG. 2—Solid-Liquid DFT Filter Schematic.

The fluid enters the DFT filter, a rotating mechanical barrier, and an internal chamber for collecting the filtered fluid. The mechanical barrier of the DFT filter can be made from any types of media such as, but not limited to woven fiber, ceramic composite, sintered metal, polymeric membrane, nano structure, mechanical perforated screens, or combination thereof. The DFT filter that can be designed to operate at any differential pressure gradient necessary for the fluid (liquid or gas) to pass through the mechanical barrier. For example, a pressure gradient of less than 1 atmosphere is all that is required for a particulate-air filtration system, whereas a pressure of 27 atmospheres or over is required to overcome the osmotic pressure of sea water in a reverse osmosis membrane system.

The DFT filter that can be designed for any given pressure depending on the application and fluid flow rate. The DFT filter that can be designed for any given sizes depending on the application and fluid flow rate. The DFT filter outer shell can be designed for any given shape such that the solids that are propelled by the centrifugal force can be collected and removed. For example, the DFT filter outer shell may be a tapered round cylinder, or a straight bore cylinder. The DFT filter that can be operated horizontally, vertically, or at any angle. The DFT filter outer shell to be fixed or rotating in the same or opposite direction of the rotating mechanical barrier. The rotating mechanical barrier to be of any shape, size or pattern. For example, the rotating mechanical barrier in a DFT can be made up a single or a stack of smooth discs or spiral grove discs. The rotating mechanical barrier be attached perpendicular to the rotating axis, or be slanted at an angle. The rotating mechanical barrier rotating continuously or programmed to rotate intermittently. The rotational speed of mechanical barrier is a design function of the centrifugal force required to overcome the momentum transfer of the fluid across the filter media. The solids that are accumulated on the shell wall by the centrifugal force, can exit the DFT filter continuously or batch wise. The DFT filter that can be applied to all types solid-fluid (liquid or gas) separation applications using any combination of mechanical barriers, motive force and filtration surface area.

In at least one exemplary embodiment, the technology described herein includes a dynamic filtration system for solid-fluid separation to eliminate or substantially reduce media blinding includes: a fluid inlet through which to receive an inlet flow of a fluid to be filtered; a filter membrane; a rotatable mechanical barrier, disposed within an outer shell, to contain the filter membrane and through which to receive and filter the inlet flow of the fluid, the rotatable mechanical barrier configured to rotate dynamically along an axis, to create a high shear flow, thereby to prevent an accumulation of solids on the filter membrane, and whereby a resultant centrifugal force propels any solids and slurry onto the outer shell to be continuously removed from the dynamic filter system; a fluid outlet through which to disperse a filtered fluid; and a solids and slurry outlet through which to disperse solids and slurry collected in filtration when propelled to the outer shell of the mechanical barrier.

In at least one embodiment of the dynamic filter system also includes a differential gear to establish a differential pressure gradient under which the dynamic filter system operates and filters fluids. The rotatable mechanical barrier is configured to operate at any differential pressure gradient required for the fluid to pass through the rotatable mechanical barrier.

In at least one embodiment of the dynamic filter system further includes a drive coupled to the rotatable mechanical barrier and configured to rotate the rotatable mechanical barrier to propel the solids and slurry.

In at least one embodiment of the dynamic filter system, the rotatable mechanical barrier comprises a filter media selected from the group consisting of: woven fiber, ceramic composite, sintered metal, polymeric membrane, nano structure, mechanical perforated screens, and a combination of two or more thereof.

In at least one embodiment of the dynamic filter system, the system is configured to operate under any given pressure depending on the application and fluid flow rate.

In at least one embodiment of the dynamic filter system, the outer shell comprises a tapered round cylinder.

In at least one embodiment of the dynamic filter system, the outer shell comprises a straight bore cylinder.

In at least one embodiment of the dynamic filter system, the system is configured for operation horizontally, vertically, and at any angle in between.

In at least one embodiment of the dynamic filter system, the outer shell is rotatable and configured to rotate in a same or opposite direction as the rotatable mechanical barrier.

In at least one embodiment of the dynamic filter system, the rotatable mechanical barrier comprises one from the group consisting of: a single smooth disc, a single groove disc, and single spiral disc, and a stack spiral disc.

In at least one embodiment of the dynamic filter system, the rotatable mechanical barrier is attached perpendicular to a rotating axis.

the rotatable mechanical barrier is attached at a slanted angle relative to a rotating axis.

In at least one embodiment of the dynamic filter system, the rotatable mechanical barrier is configured to rotate continuously.

In at least one embodiment of the dynamic filter system, the rotatable mechanical barrier is configured to rotate intermittently.

In at least one embodiment of the dynamic filter system, the rotatable mechanical barrier is configured to rotate at a rate between 0 and 50,000 revolutions per minute (RPM).

In at least one embodiment of the dynamic filter system, the system is configured to exit the solids by a means selected from the group consisting of: continuously, and in a batch process.

In another exemplary embodiment, the technology described herein includes method for dynamic filtration for solid-fluid separation to eliminate or substantially reduce media blinding. The method includes: utilizing a dynamic filter system for solid-fluid separation to eliminate or substantially reduce media blinding, the dynamic filter system including: a fluid inlet through which to receive an inlet flow of a fluid to be filtered; a filter membrane; a rotatable mechanical barrier, disposed within an outer shell, to contain the filter membrane and through which to receive and filter the inlet flow of the fluid, the rotatable mechanical barrier configured to rotate dynamically along an axis, to create a high shear flow, thereby to prevent an accumulation of solids on the filter membrane, and whereby a resultant centrifugal force propels any solids and slurry onto the outer shell to be continuously removed from the dynamic filter system; a fluid outlet through which to disperse a filtered fluid; and a solids and slurry outlet through which to disperse solids and slurry collected in filtration when propelled to the outer shell of the mechanical barrier; and rotating the rotatable mechanical barrier.

In at least one embodiment of the method, the dynamic filter system utilized further includes a differential gear to establish a differential pressure gradient under which the dynamic filter system operates and filters fluids, wherein the rotatable mechanical barrier is configured to operate at any differential pressure gradient required for the fluid to pass through the rotatable mechanical barrier; and the method includes establishing a pressure gradient under which the dynamic filter system operates.

In at least one embodiment of the method, the dynamic filter system utilized further includes a drive coupled to the rotatable mechanical barrier and configured to rotate the rotatable mechanical barrier to propel the solids and slurry;

and the method includes rotating the rotatable mechanical barrier to propel the solids and slurry to the outer shell.

In at least one embodiment of the method, the outer shell is rotatable and configured to rotate in a same or opposite direction as the rotatable mechanical barrier; and the method further includes rotating the outer shell.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the technology described herein. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which:

FIG. 1A is a schematic view of an air filter of the prior art, and in which the filter membrane may be inefficient at capturing all of the particulate matters, illustrating, in particular, surface air filtration, and using a low density woven fiber membrane, according to what is known in the prior art;

FIG. 1B is a schematic view of a fluid filter of the prior art, and in which the filter membrane may have a low productivity and in which a large amount of surface area must be provided and in which a significant percentage of the fluid is rejected in order to minimize blinding, illustrating, in particular, cross flow filtration, and using a low density woven fiber membrane.

DETAILED DESCRIPTION OF THE INVENTION

Figure 2:
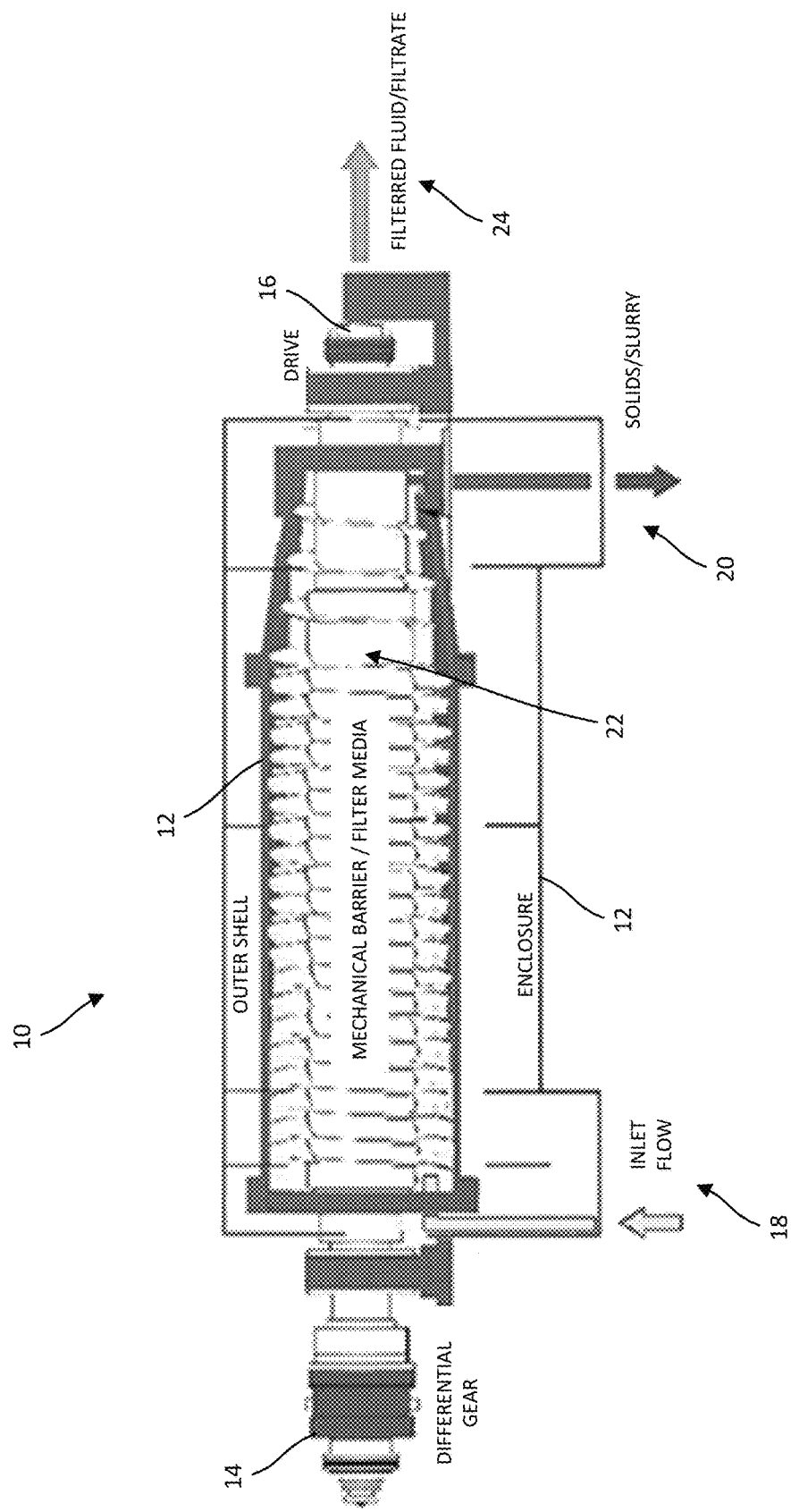
FIG. 2 is a schematic view of a solid-liquid dynamic filtration technology filter schematic, illustrating, in particular, a dynamically rotating mechanical barrier, configured to rotate dynamically along its axis, thereby creating a high flow, and thereby preventing the accumulation of solids on the filter membrane, according to an embodiment of the technology described herein.

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

The Dynamic Filtration Technology (DFT) technology described herein is a new and novel filtration process for solid-fluid (solid-liquid or solid-gas) separation that can eliminate, or at a minimum, can reduce media blinding. Solid-liquid and solid-gas filters are ubiquitous in consumer products, as well as the agricultural, commercial, industrial, military and residential markets.

Filtration is effectively a mechanical barrier that retains the solids while allowing the fluid (liquid or gas) to pass through. There are three principal design parameters for solid-fluid separation: 1) types of mechanical barrier, 2) motive force and 3) filtration surface area.

For the removal of gross solid particles, a media/multi-media filter for a solid-solvent system or a cyclone filter for solid-gas system, is generally used. For micron size particulates, an inexpensive filter cloth is commonly employed. For sub-micron and nano-meter size particles, or dissolved solids in a solvent, a membrane is used.

The motive force can be vacuum, pressurized system, or electrically induced electrochemical force. Regardless of the types of mechanical barrier and motive force used in a filtration system, the accumulation of solids on the filtration surface invariably increases the pressure gradient across the mechanical barrier. The filter life can be extended by: increasing the surface area available for a static type screen filter (pleated cartridge and/or multiple cartridges for a solid-liquid system, or pleated HEPA filter and/or multiple chambers for a solid-gas system); mechanical compression of the solids on the filter housing and then dislodging the cake for a solid-liquid system (Fundabac®) or back pressure pulsing of the baghouse filter to dislodge the solids for a solid-gas system; physical removal of the accumulating solid cake on the filter media using a blade; back washing the media or multi-media filter; rejecting the concentrated filtration stream (reverse osmosis filter); or minimizing the accumulation of solids by imposing an high fluid velocity across filter media (cross-flow filter).

The new and novel aspect of the technology described herein is based on a dynamic filtration process whereby the mechanical barrier itself is designed to rotate along its axis, preventing solids from blinding the surface of the mechanical barrier due to the high shear force, and with the resulting centrifugal force, propels the solids onto the outer shell where it can be continuously removed from the system. This dynamic filtration process can be applied to all types solid-fluid (liquid or gas) separation applications using any combination of mechanical barriers, motive force and filtration surface area.

Filtration is effectively a mechanical barrier that retains the solids while allowing the fluid (liquid or gas) to pass through. The application of solid-liquid and solid-gas separation technologies is ubiquitous in consumer products, as well as the agricultural, commercial, industrial, military and residential markets. Finally, an efficient solid-liquid separation technology is critical to pollution control, and to make water a sustainable resource to support population growth and promote industrial development.

The Dynamic Filtration Technology (DFT) technology described herein is a new and novel filtration process for solid-fluid (solid-liquid or solid-gas) separation that can eliminate, or at a minimum, reduces media blinding. This is achieved by allowing the mechanical barrier itself to rotate along its axis, preventing solids from blinding the surface of the mechanical barrier due to the high shear force, and with the resulting centrifugal force, propels the solids onto the outer shell where it can be continuously removed from the system, FIG. 2—Solid-Liquid DFT Filter Schematic.

As depicted in FIG. 2, the fluid enters the DFT filter, a rotating mechanical barrier, and an internal chamber for collecting the filtered fluid. The mechanical barrier of the DFT filter can be made from any types of media such as, but not limited to woven fiber, ceramic composite, sintered metal, polymeric membrane, nano structure, mechanical perforated screens, or combination thereof. The DFT filter that can be designed to operate at any differential pressure gradient necessary for the fluid (liquid or gas) to pass through the mechanical barrier. For example, a pressure gradient of less than 1 atmosphere is all that is required for a particulate-air filtration system, whereas a pressure of 27 atmospheres or over is required to overcome the osmotic pressure of sea water in a reverse osmosis membrane system.

The DFT filter that can be designed for any given pressure depending on the application and fluid flow rate.

The DFT filter that can be designed for any given sizes depending on the application and fluid flow rate.

The DFT filter outer shell can be designed for any given shape such that the solids that are propelled by the centrifugal force can be collected and removed. For example, the DFT filter outer shell me be a tapered round cylinder, or a straight bore cylinder.

The DFT filter that can be operated horizontally, vertically, or at any angle.

The DFT filter outer shell to be fixed or rotating in the same or opposite direction of the rotating mechanical barrier. The rotating mechanical barrier to be of any shape, size or pattern. For example, the rotating mechanical barrier in a DFT can be made up a single or a stack of smooth discs or spiral grove discs. The rotating mechanical barrier be attached perpendicular to the rotating axis, or be slanted at an angle.

The rotating mechanical barrier cab be rotating continuously or programmed to rotate intermittently. The rotational speed of mechanical barrier is a design function of the centrifugal force required to overcome the momentum transfer of the fluid across the filter media.

The solids that are accumulated on the shell wall by the centrifugal force, can exit the DFT filter continuously or batch wise. The DFT filter that can be applied to all types solid-fluid (liquid or gas) separation applications using any combination of mechanical barriers, motive force and filtration surface area.

In at least one exemplary embodiment, the technology described herein includes a dynamic filtration system 10. The dynamic filtration system 10 is for solid-fluid separation to eliminate or substantially reduce media blinding.

The dynamic filtration system 10 includes a housing or enclosure 12 into which the various filtration components are placed.

The dynamic filtration system 10 includes a fluid inlet 18 through which to receive an inlet flow 18 of a fluid to be filtered.

The dynamic filtration system 10 includes a filter membrane, such as the filter media of the mechanical barrier.

The dynamic filtration system 10 includes a rotatable mechanical barrier 22. The rotatable mechanical barrier 22 is disposed within an outer shell 12. The rotatable mechanical barrier 22 is configured to contain the filter membrane and through which to receive and filter the inlet flow of the fluid 18. The rotatable mechanical barrier 22 is configured to rotate dynamically along an axis, to create a high shear flow, thereby to prevent an accumulation of solids on the filter membrane, whereby a resultant centrifugal force propels any solids and slurry onto the outer shell 12 to be continuously removed from the dynamic filter system 10.

The dynamic filtration system 10 includes a fluid outlet 24 through which to disperse a filtered fluid as it exits the system.

The dynamic filtration system 10 includes a solids and slurry outlet 20 through which to disperse solids and slurry collected in filtration when propelled to the outer shell 12 of the mechanical barrier 22.

In at least one embodiment of the dynamic filter system 10 also includes a differential gear 14 to establish a differential pressure gradient under which the dynamic filter system 10 operates and filters fluids. The rotatable mechanical barrier 22 is configured to operate at any differential pressure gradient required for the fluid to pass through the rotatable mechanical barrier 22.

In at least one embodiment of the dynamic filter system 10 further includes a drive 16 coupled to the rotatable mechanical barrier 22 and configured to rotate the rotatable mechanical barrier 22 to propel the solids and slurry to the outer shell 12.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology described herein and are intended to be covered by the following claims.

What is claimed is:

1. A cross-flow dynamic filtration system for solid-fluid separation to eliminate or substantially reduce media blinding, the dynamic filter system comprising:
    a fluid inlet through which to receive an inlet flow of a fluid to be filtered;
    a filter membrane;
    a rotatable mechanical barrier, disposed within an outer shell, the filter membrane disposed within, and through which to receive and filter the inlet flow of the fluid, the rotatable mechanical barrier configured to rotate dynamically along an axis, to create a high shear cross flow against the filter membrane, thereby to prevent an accumulation of solids on the filter membrane, and whereby a resultant centrifugal force propels any solids and slurry onto the outer shell to be continuously and automatically removed from the dynamic filter system;
    a fluid outlet through which to disperse a filtered fluid; and
    a solids and slurry outlet through which to disperse solids and slurry collected in filtration when propelled to the outer shell of the mechanical barrier;
    wherein the dynamic filtration system is a cross-flow system;
    wherein removal of filtered solids and sludge is solely through centrifugal force and not mechanical structure to prevent accumulation of solids or sludge on the filter membrane.

2. The dynamic filtration system of claim 1, further comprising:
    a differential gear to establish a differential pressure gradient under which the dynamic filter system operates and filters fluids; and wherein the rotatable mechanical barrier is configured to operate at any differential pressure gradient required for the fluid to pass through the rotatable mechanical barrier.

3. The dynamic filtration system of claim 1, further comprising:
a drive coupled to the rotatable mechanical barrier and configured to rotate the rotatable mechanical barrier to propel the solids and slurry.

4. The dynamic filtration system of claim 1, wherein the filter membrane is selected from the group consisting of: woven fiber, ceramic composite, sintered metal, polymeric membrane, nano structure, mechanical perforated screens, and a combination of two or more thereof.

5. The dynamic filtration system of claim 1, wherein the system is configured to operate under any given pressure depending on the application and fluid flow rate.

6. The dynamic filtration system of claim 1, wherein the outer shell comprises a tapered round cylinder.

7. The dynamic filtration system of claim 1, wherein the outer shell comprises a straight bore cylinder.

8. The dynamic filtration system of claim 1, wherein the system is configured for operation horizontally, vertically, and at any angle in between.

9. The dynamic filtration system of claim 1, wherein the outer shell is rotatable and configured to rotate in a same or opposite direction as the rotatable mechanical barrier.

10. The dynamic filtration system of claim 1, wherein the rotatable mechanical barrier is selected from the group consisting of: a single smooth disc, a single groove disc, and single spiral disc, and a stack spiral disc.

11. The dynamic filtration system of claim 1, wherein the rotatable mechanical barrier is attached perpendicular to a rotating axis.

12. The dynamic filtration system of claim 1, wherein the rotatable mechanical barrier is attached at a slanted angle relative to a rotating axis.

13. The dynamic filtration system of claim 1, wherein the rotatable mechanical barrier is configured to rotate continuously.

14. The dynamic filtration system of claim 1, wherein the rotatable mechanical barrier is configured to rotate intermittently.

15. The dynamic filtration system of claim 1, wherein the rotatable mechanical barrier is configured to rotate at a rate between 0 and 50,000 revolutions per minute (RPM).

16. The dynamic filtration system of claim 1, wherein the system is configured to exit the solids by a means selected from the group consisting of: continuously, and in a batch process.

17. A method for cross-flow dynamic filtration for solid-fluid separation to eliminate or substantially reduce media blinding, the method comprising:
utilizing a cross-flow dynamic filter system for solid-fluid separation to eliminate or substantially reduce media blinding, the dynamic filter system comprising:
a fluid inlet through which to receive an inlet flow of a fluid to be filtered;
a filter membrane;
a rotatable mechanical barrier, disposed within an outer shell, the filter membrane disposed within, and through which to receive and filter the inlet flow of the fluid, the rotatable mechanical barrier configured to rotate dynamically along an axis, to create a high shear cross flow against the filter membrane, thereby to prevent an accumulation of solids on the filter membrane, and whereby a resultant centrifugal force propels any solids and slurry onto the outer shell to be continuously and automatically removed from the dynamic filter system;
a fluid outlet through which to disperse a filtered fluid; and
a solids and slurry outlet through which to disperse solids and slurry collected in filtration when propelled to the outer shell of the mechanical barrier; and
rotating the rotatable mechanical barrier;
wherein the dynamic filtration system is a cross-flow system;
wherein removal of filtered solids and sludge is solely through centrifugal force and not mechanical structure to prevent accumulation of solids or sludge on the filter membrane.

18. The method of claim 17, wherein the dynamic filter system utilized further comprises:
a differential gear to establish a differential pressure gradient under which the dynamic filter system operates and filters fluids, wherein the rotatable mechanical barrier is configured to operate at any differential pressure gradient required for the fluid to pass through the rotatable mechanical barrier; and
establishing a pressure gradient under which the dynamic filter system operates.

19. The method of claim 17, wherein the dynamic filter system utilized further comprises:
drive coupled to the rotatable mechanical barrier and configured to rotate the rotatable mechanical barrier to propel the solids and slurry; and
rotating the rotatable mechanical barrier to propel the solids and slurry to the outer shell.

20. The method of claim 17, wherein the outer shell is rotatable and configured to rotate in a same or opposite direction as the rotatable mechanical barrier, the method further comprising:
rotating the outer shell.

* * * * *